(12) United States Patent
Hofmann et al.

(10) Patent No.: US 6,431,631 B1
(45) Date of Patent: Aug. 13, 2002

(54) DEVICE FOR RELEASABLY FASTENING A VEHICLE SEAT OR PARTS OF A VEHICLE SEAT IN A MOTOR VEHICLE

(75) Inventors: Jochen Hofmann, Kups; Gregor Kroener, Bischberg, both of (DE)

(73) Assignee: Brose Fahrzeugteile GmbH & Co. KG, Coburg (DE)

( * ) Notice: Subject to any disclaimer, the term of this patent is extended or adjusted under 35 U.S.C. 154(b) by 0 days.

(21) Appl. No.: 09/831,016

(22) PCT Filed: Oct. 15, 1999

(86) PCT No.: PCT/DE99/03397

§ 371 (c)(1),
(2), (4) Date: May 5, 2001

(87) PCT Pub. No.: WO00/27664

PCT Pub. Date: May 18, 2000

(30) Foreign Application Priority Data

Nov. 5, 1998 (DE) .......................... 198 52 540

(51) Int. Cl.[7] .................................. B60N 2/02
(52) U.S. Cl. ...................... 296/65.03; 439/34
(58) Field of Search .................. 296/65.03, 65.13, 296/65.01; 439/34

(56) References Cited

U.S. PATENT DOCUMENTS

| 4,763,360 | A | * | 8/1988 | Daniels et al. |
| 5,482,345 | A | * | 1/1996 | Bolsworth et al. |
| 5,765,894 | A | * | 6/1998 | Okazaki et al. |
| 5,800,015 | A | * | 9/1998 | Tsuchiya et al. |
| 5,803,491 | A | * | 9/1998 | Barnes et al. |
| 5,820,216 | A | * | 10/1998 | Feuillet |
| 5,890,779 | A | * | 4/1999 | Blackburn et al. |
| 6,050,835 | A | * | 4/2000 | Henrion et al. |
| 6,267,430 | B1 | * | 7/2001 | Cresseaux |
| 6,279,981 | B1 | * | 8/2001 | Mesnage |
| 6,334,601 | B1 | * | 1/2002 | Hur et al. |
| 6,345,867 | B1 | * | 2/2002 | Hellrung et al. |
| 6,357,814 | B1 | * | 3/2002 | Boisset et al. |

FOREIGN PATENT DOCUMENTS

| DE | 195 44 833 | 6/1997 |
| EP | 0 863 042 | 9/1998 |

* cited by examiner

*Primary Examiner*—Joseph D. Pape
*Assistant Examiner*—Scott Carpenter
(74) *Attorney, Agent, or Firm*—Christie, Parker & Hale, LLP (57) ABSTRACT

A device for releasably fastening a vehicle seat or parts of a vehicle seat includes at least one electrical contact element that can couple with an electric contact element on the vehicle side, in a motor vehicle having a locking mechanism that can be unlocked to remove the seat or parts of the seat from the motor vehicle. A removal lock prevents unlocking of the locking mechanism when the two contact elements are coupled. The removal lock includes a securing element which, when the contact elements are coupled together, is mounted between a movable locking element of the locking mechanism and a stop connected to the vehicle seat. The removal lock is forced by the locking element against the stop when an attempt is made to unlock the seat.

24 Claims, 7 Drawing Sheets

DEVICE FOR RELEASABLY FASTENING A VEHICLE SEAT OR PARTS OF A VEHICLE SEAT IN A MOTOR VEHICLE

CROSS REFERENCE TO RELATED APPLICATION

This application claims priority of International application number PCT/DE99/03397, filed Oct. 15, 1999, which in turn claims priority to German patent application number 19852540.0, filed Nov. 5, 1998.

1. Field of Invention

The invention relates to a device for releasably fastening a vehicle seat or parts of a vehicle seat in a motor vehicle.

2. Background of Invention

A device for releasably fastening a vehicle seat is known from DE 195 44 833 A1. The known device comprises a rear fastening hook which is open in the travel direction and in which a fastening bolt on the side of the vehicle floor can engage, and a front slide guide for supporting the vehicle seat on the front fastening bolt, as well as a rotary mounted claw-like locking lever which is biased by spring force and which locks the front fastening bolt in the slide guide. The rear fastening bolt is associated with a swivel mounted claw-like primary locking part which is loaded by spring force against the locking position and whose position on reaching the locking position can likewise be locked by a secondary locking element, and the front primary locking element as well as the rear secondary locking element are connected together by a coupling rod.

With a device of this kind, a vehicle seat can be readily locked and unlocked again in order to fix it in the vehicle and remove it from the vehicle respectively. If the vehicle seat is an electrified seat which is provided with electric seat adjustment devices, then the device for locking and unlocking the seat is normally combined with a removal lock which prevents unlocking of the seat for as long as the latter is connected to the main power network of the vehicle through corresponding contact elements.

This additional measure prevents the electrical connecting elements from becoming damaged when attempts are made to unlock the seat and remove it from the vehicle even though the electric plug connections have not yet been released. The known removal locks however, are, very expensive to construct and they comprise numerous functional elements.

SUMMARY OF THE INVENTION

The object of the invention is to provide a device for releasably fastening a vehicle seat or parts of a vehicle seat in a motor vehicle through which the removal of the seat is reliably prevented with simple means for as long as the latter is connected to the electric mains power of the vehicle through corresponding contact elements.

This is achieved according to the invention by providing a device having the following features:

According to the present invention, the removal lock comprises a single securing element which is mounted between a movable locking element of the locking mechanism and a stop connected to the vehicle seat when an electric contact element on the seat side is coupled to a corresponding electric contact element on the vehicle side, whereby during an attempt at unlocking the seat, the securing element is forced by the locking element against the stop.

In this solution the securing element restricts the movement of the locking element associated with the locking mechanism; thereby preventing the unlocking of the seat during an attempt to unlock the seat, this locking element forces the securing element against a stop so that further movement of the locking element is prevented. Since this locking element is coupled to the locking mechanism, the movement of the locking mechanism required for unlocking is prevented.

The force applied by a person attempting to unlock the seat is thereby introduced by the securing element into the stop and is absorbed by the stop. Damage to the locking mechanism or to the removal lock is thereby avoided during a forced attempt to unlock the seat.

The solution according to the invention is characterised more particularly by a simple construction of the removal lock which only consists of a single structural element. This lock is highly stable since any forces acting on the removal lock are taken up by a stop.

In a preferred embodiment of the invention the securing element for preventing unlocking is mounted between the locking element and the stop so that the securing element only transfers compression forces to the stop. This can be achieved for example by the forces exerted by the locking element onto the securing element being directed straight to the stop.

Furthermore the locking element preferably engages on the side of the securing element that sets the greatest resistance moment opposite any shear forces that may appear. In the case of a flat surface securing element, the forces exerted by the locking element should engage on an edge of the flat securing element and should thereby be directed along the surface.

In order to achieve a simple construction of the removal lock, the securing element is preferably formed in one piece as a sheet metal part or as an Outsert part where metal function areas are injection moulded in a plastics cover.

According to one embodiment of the invention, the securing element is connected for swivel movement to a part of the vehicle seat where the swivel movement is preferably ensured through a bending area integrated in the securing element. The securing element can thereby be integrated in one piece into the housing of the electric contact element on the seat side. On the other side the securing element is connected to the vehicle seat through a suspension mounting.

The securing element in this embodiment preferably has an operating section through which the securing element enters into active connection with the contact element on the vehicle side when this contact element is coupled to the contact element on the seat side whereby the securing element is guided between the locking element and the stop.

Furthermore a resilient section can be formed in one piece on the securing element through which the securing element is supported on the vehicle seat and which counteracts the insertion of the securing element between the locking element and the stop. This resilient section ensures that the securing element automatically leaves its position between the locking element and the stop when the electric contact element on the seat side is not coupled with the electric contact element on the vehicle side. The seat can then be readily unlocked and removed from the vehicle.

According to a further variation of the invention the securing element is connected to the contact element on the vehicle side and is integrated in particular in one piece into the housing. With this variation of the invention the securing element automatically engages between the locking element and the associated stop when the contact element on the vehicle side is coupled to the contact element on the seat side.

If the seat which is to be releasably connected to the vehicle has a longitudinal seat adjustment, the locking mechanism is preferably connected through at least one bearing block to the lower rail of the longitudinal adjustment and then in this case the stop is also formed on this bearing block.

The bearing block has a passage opening through which the securing element can be mounted between the locking element and the associated stop.

The locking element is preferably mounted on the same axis as a locking element of the locking mechanism and is able to swivel together with the locking element.

The contact elements through which the electrical devices of the vehicle seat are connected to the electrical mains power of the vehicle are more particularly a plug and a plug socket.

Further advantages of the invention will now be explained in further detail with reference to the embodiments shown in the drawings in which.

Figure 1:
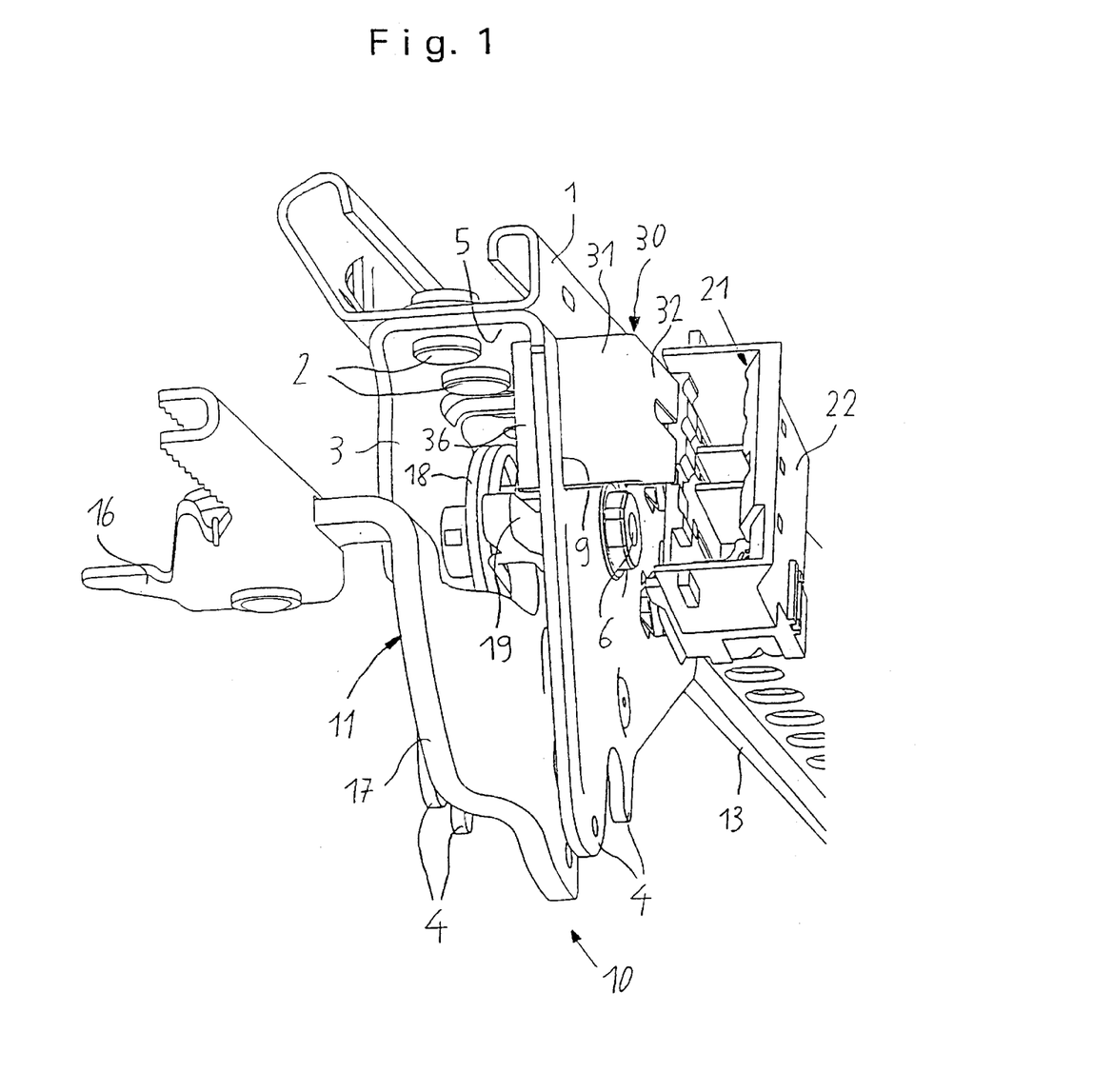
FIG. 1 shows a locking mechanism with a non-activated removal lock in the locked state.

FIG. 1 shows in a perspective view an end section of the lower rail 1 of a rail guide for the longitudinal displacement of a motor vehicle seat. A substantially U-shaped bearing block 3 is fixed by fastening elements 2 on the end section of the lower rail 1 and at its ends remote from the lower rail 1 extends out into two pairs 4 of hooks.

The bearing block 3 holds the front locking device 11 of a locking mechanism 10 (see FIG. 3) through which the lower rail 1 and thus the entire vehicle seat can be releasably fastened on the floor assembly of the motor vehicle.

The front locking device 11 comprises a lock element 17 which can swivel about an axis 6 and which is held under pretension through a torsion spring 18 in its locking position in which the lower rail 1 is fixed on the floor assembly of the motor vehicle. This locking position can be lifted by means of an operating lever 16 by swivelling the lock element 17 about the axis 6 into the unlocking position shown in FIG. 2.

The construction and function of a locking mechanism of this kind are known and will therefore not be described in further detail. For further details relating to the construction and function of comparable locking mechanisms reference is made by way of example to the DE 195 44 833 and the specifications cited therein.

Figure 4:
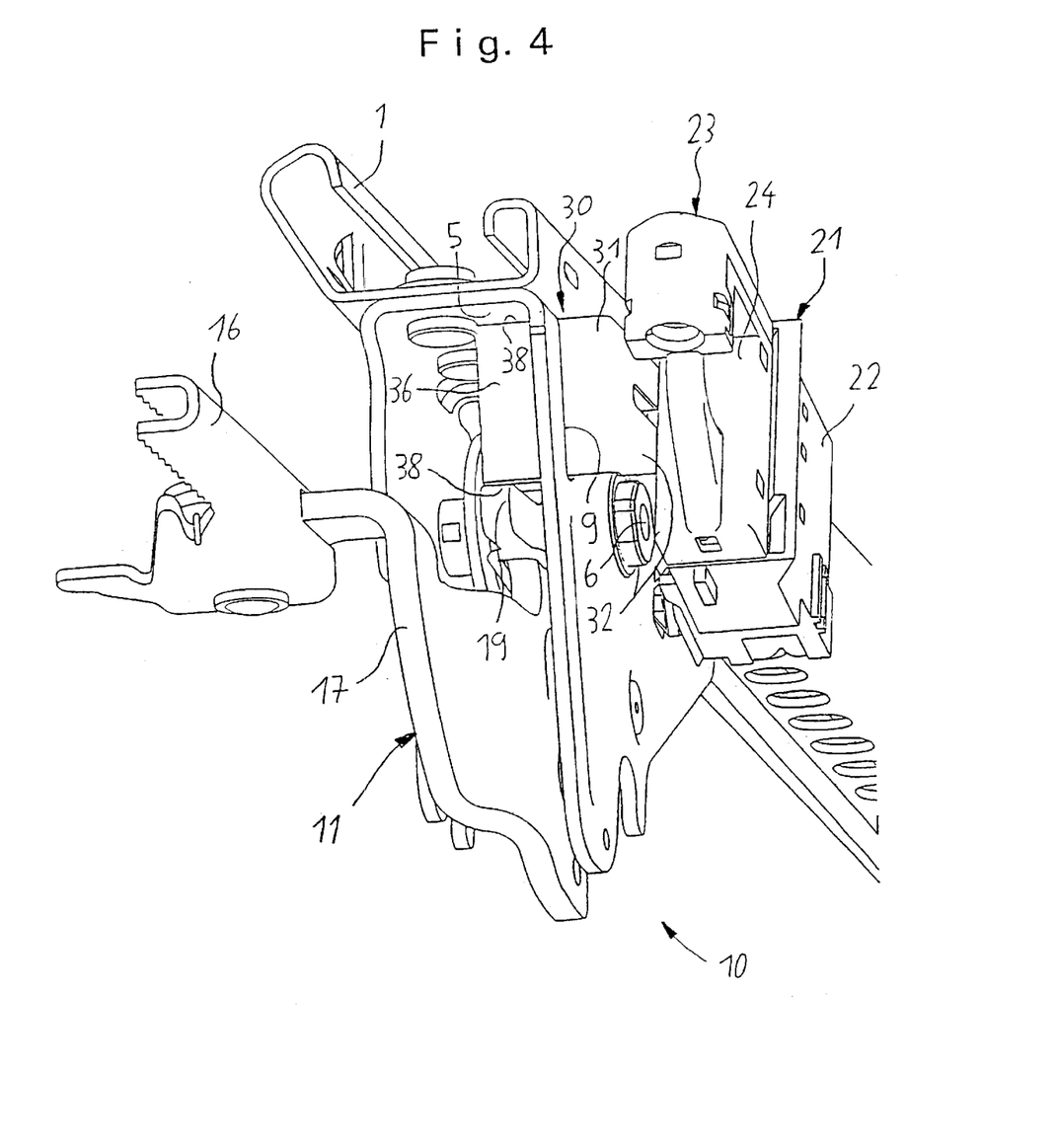
FIG. 4 shows the locking mechanism of FIG. 1 in the locked state with an activated removal lock.

In addition to the locking device 11 a contact 21 is fixed on the bearing block 3 with a contact housing 22 through which current can be supplied to the vehicle seat by inserting a plug connected to the central power supply into the socket 21, as shown in FIG. 4. Supplying current to the motor vehicle seat is necessary to supply the required energy to the electrical adjustment devices of the seat, such as for example the longitudinal seat adjustment, height adjustment and incline adjustment as well as height adjustment of the head restraint etc.

In order to prevent the electrical structural elements from becoming damaged if an attempt is made to remove the seat from the vehicle whilst the seat is connected to the central power supply through the socket 21, the locking mechanism 10 is provided with a removal lock 30.

Figure 6:
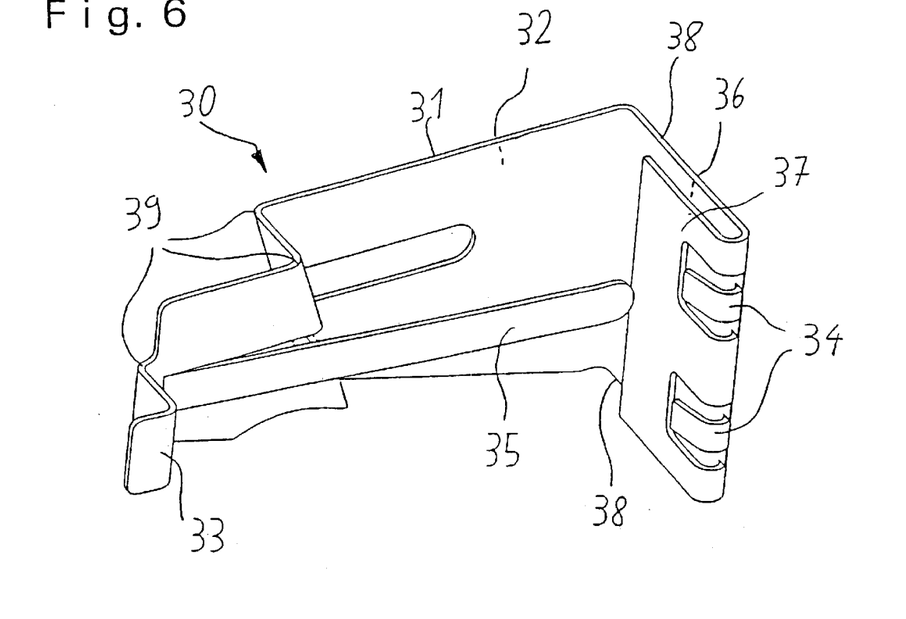
FIG. 6 shows an embodiment of a securing element which is used as a removal lock in the locking mechanism of FIGS. 1 to 5.

This removal lock 30 comprises a single one-piece securing element 31 which is formed as a sheet metal part and which is connected at its front end for swivel movement to the bearing block 3 through a suspension mounting 33, as shown in FIG. 6. The securing element 31 has an operating surface 32 which runs slightly inclined to the insert direction of a contact into the socket 21, as well as a flat surface section 36 which is angled away from the operating surface and points through a passage opening 9 in the bearing block 3 towards the lock element 17.

Figure 3:
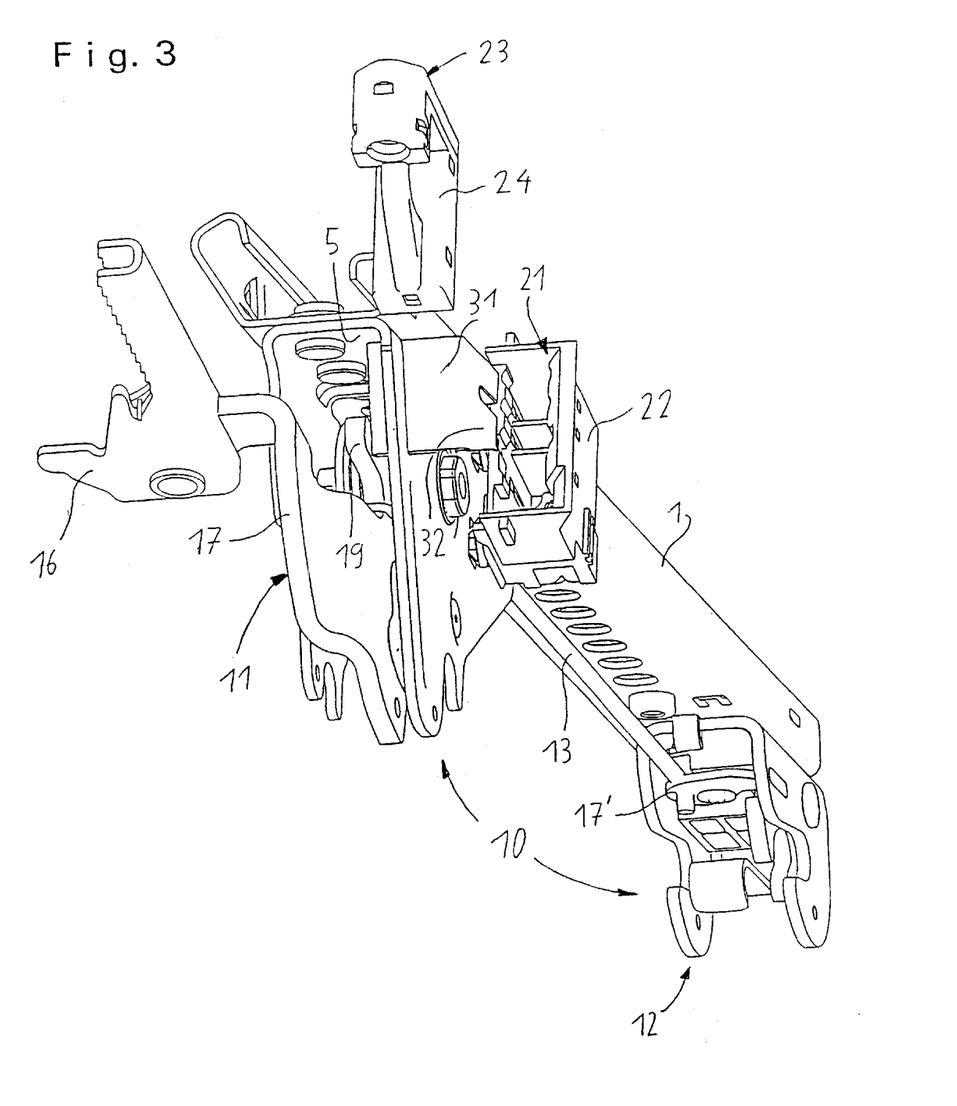
FIG. 3 shows a complete lower rail of a seat longitudinal adjustment device with the locking mechanism of FIGS. 1 and 2.

FIG. 1 shows the locked state of the front locking device 11 in which the vehicle seat is not connected to the central power supply through the socket 21. In this state the front locking device 11 can be unlocked by moving the lever 16 upwards whereby the lock element 17 turns in the clockwise direction about the swivel axis 6. The movement of the lock element 17 is thereby transferred through the coupling rod 13 to the rear locking device 12 of the locking mechanism 10, as shown in FIG. 3). Further details on this can be obtained for example from DE 195 44 833 A1.

Figure 2:
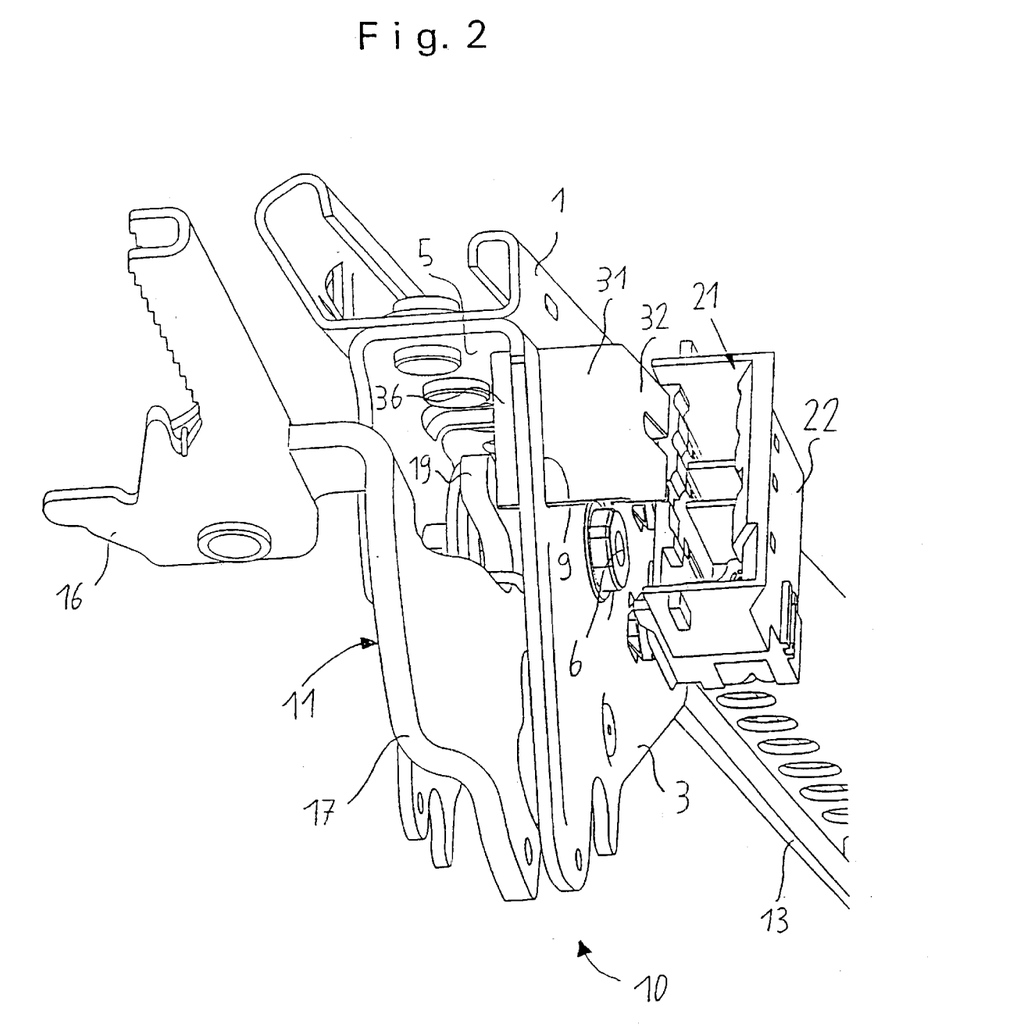
FIG. 2 shows the locking mechanism of FIG. 1 in the unlocked state.

Through the operation of the lever 16 described above, the lock element 17 occupies the unlocking position shown in FIGS. 2 and 3 in which the lower rail 1 is no longer fixedly connected to the floor assembly of the vehicle so that the seat can be removed from the vehicle. It can also be seen from FIG. 3 how the coupling rod 13 transfers a movement of the front lock element 17 to a lock element 17' associated with the rear locking device 12 so that also in the region of the rear locking device 12 the connection between the lower rail 1 and the floor assembly of the motor vehicle becomes released.

It is clear from FIGS. 1 to 3 that the securing element 31 does not block the swivel movement of the lock element 17 which is required for unlocking. The securing element 31 is thus not located with its flat surface section 36 between the locking element 19 formed as a blocking nose and connected to the lock element 17, and the abutment 5 associated with this locking element 19 on the base surface of the bearing block 3. Consequently the locking mechanism 10 can be readily unlocked so long as the contact 23 (see FIG. 3) is out of the socket 21.

FIG. 4 shows the front locking device 11 of the locking mechanism 10 in its locked state (corresponding to FIG. 1). In this figure, however, a contact 23 connected to the central mains power of the motor vehicle and mounted in a housing 24 is additionally inserted in the socket 21.

When inserting the contact 23 into the socket 21, the latter slides over the slightly inclined operating face 32 of the securing element 31 which is connected for swivel movement to the bearing lock. A swivel movement of the securing element 31 is thereby triggered as a result of which the angled flat surface section 36 is guided through the opening 9 in the bearing block 3 between the locking element 19 and the abutment 5 provided on the bearing block 3. In this position the securing element 31 prevents the locking mechanism 10 from becoming unlocked.

Thus if an attempt is made to unlock the locking mechanism 10 by moving the lever 16 upwards, the locking element 19 which is formed as a blocking nose swivels together with the lock element 17 about the axis 6. The locking element 19 moves into contact with the lower edge 38 of the flat surface section 36 of the securing element 31 even after a slight swivel movement. Further movement of the locking element 19 is then impossible because the flat surface section 36 of the securing element 31 is clamped by its edges 38 between the locking element 19 and the abutment 5. Since the locking element 19 is connected integral with the lock element 17 movement of the locking mechanism as a whole is now prevented.

It is thus impossible to unlock the locking mechanism 10 if the contact 23 is in the socket 21.

If great force is applied in an attempt to unlock the seat by operating the lever 16, then the forces introduced through the locking element 19 into the flat surface section 36 of the securing element 31 are taken up by the abutment 5 which is supported in turn on the base surface of the lower rail 1. Through this very stable design of the removal lock 30 it is possible to prevent damage to the securing element 31. In addition, the securing element 31 has a reinforcement in its angled flat surface section 36, as shown in FIG. 6, and the flat surface section 36 of the securing element 31 is substantially only loaded with compressive forces by the blocking element 19.

Then, the forces exerted by the locking element 19 act directly on the abutment 5. Therefore no bending forces act on the flat surface section 36 which could lead to it becoming deformed.

The influence of any possible shear forces is thereby minimized in that the locking element 19 engages on an edge 38 of the flat surface section 36 where a particularly large resistance moment counteracts the shear forces.

Figure 5:
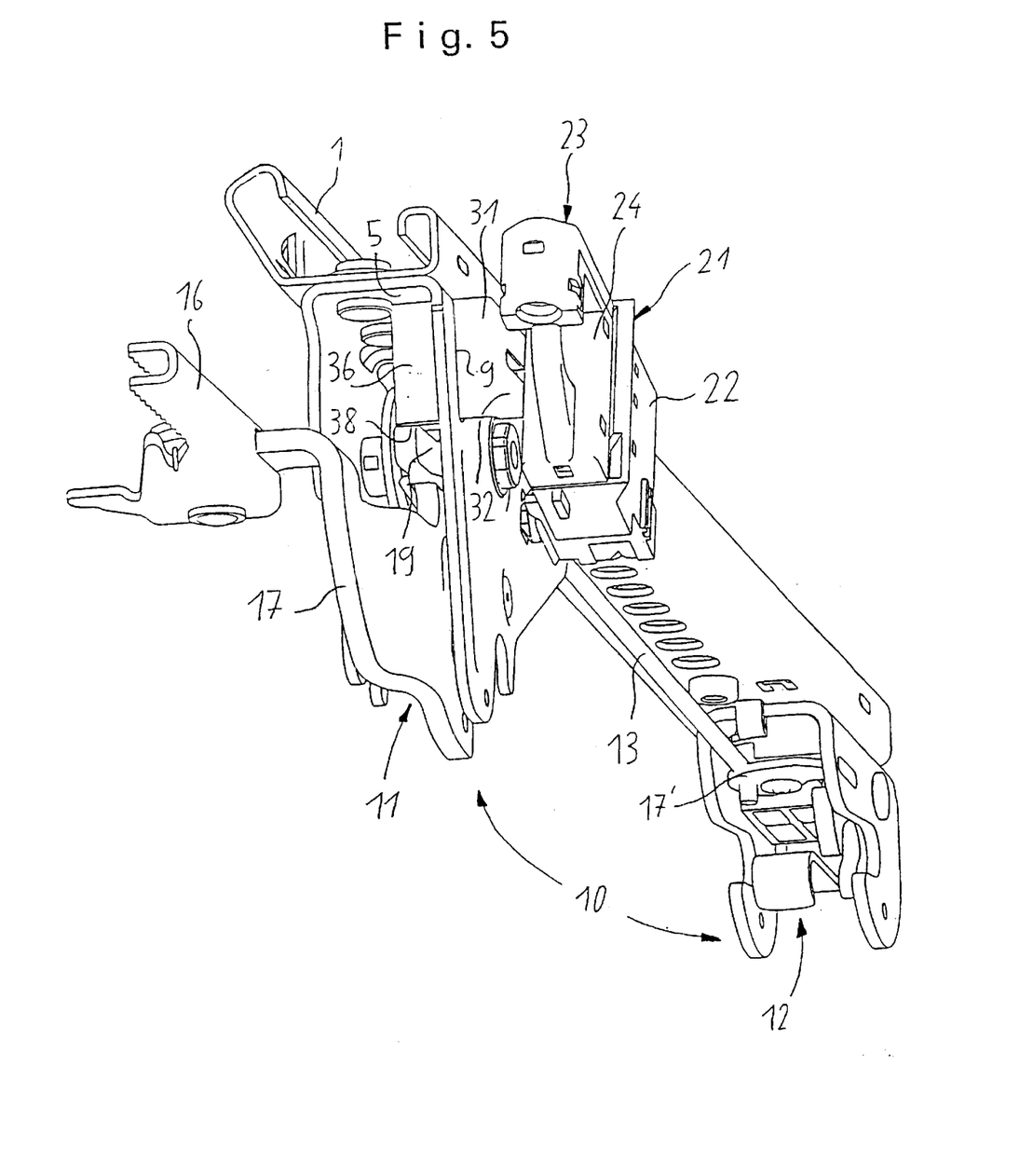
FIG. 5 shows a complete lower rail of a seat longitudinal adjustment device with the locking mechanism of FIG. 4.

FIG. 5 shows the entire lower rail 1 of a longitudinal rail guide including the locking mechanism 10 wherein the front locking device 11 is located in the state shown in FIG. 4. The coupling rod 13 thereby ensures that even the rear locking device 12 is locked.

For further details on the locking device shown in FIGS. 4 and 5 reference is made to the corresponding description of FIGS. 1 to 3. In FIGS. 1 and 3 on the one hand and in FIGS. 4 and 5 on the other matching component parts are each provided with the same reference numerals.

FIG. 6 shows in further detail the removal lock 30 of FIGS. 1 to 5 which consists of a single securing element 31 formed as a sheet metal part. The removal lock 31 comprises an operating surface 32 and a flat surface section 36 which is angled out therefrom and which is restricted at each of its two ends by an edge 38. These constituent parts of the securing element 31 have already been described in more detail with reference to FIGS. 1 to 5.

In addition, it can be seen from FIG. 6 that the flat surface section 36 has a reinforcement 37 which is formed by folding around an area of the material. The securing element 31 is supported in the position illustrated in FIGS. 1 to 3 from inside on the edge of the passage opening 9 of the bearing block 3 by two clip elements 34, formed from the material area 37.

At its front end, the securing element has a suspension mounting 33 through which the securing element 31 is suspended in a suitable opening of the bearing block 3. The suspension mounting 33 is adjoined by a section of the securing element 31 which serves as a bearing area 39. This area is deformed when a contact element 23, as shown in FIG. 4, acts on the operating section 32 of the securing element 31. The flat surface section 36 of the securing element 31 executes a swivel movement until it engages between the abutment 5 and the locking element 19, as shown in FIG. 4.

Furthermore, a spring section 35 is integrated in one piece in the securing element 31 through which the securing element 31 is supported on the outside wall of the bearing block 3. It is hereby ensured that the securing element 31 is located in the one locking position according to FIGS. 1 to 3 when no contact is inserted in the socket 21.

Figure 7:
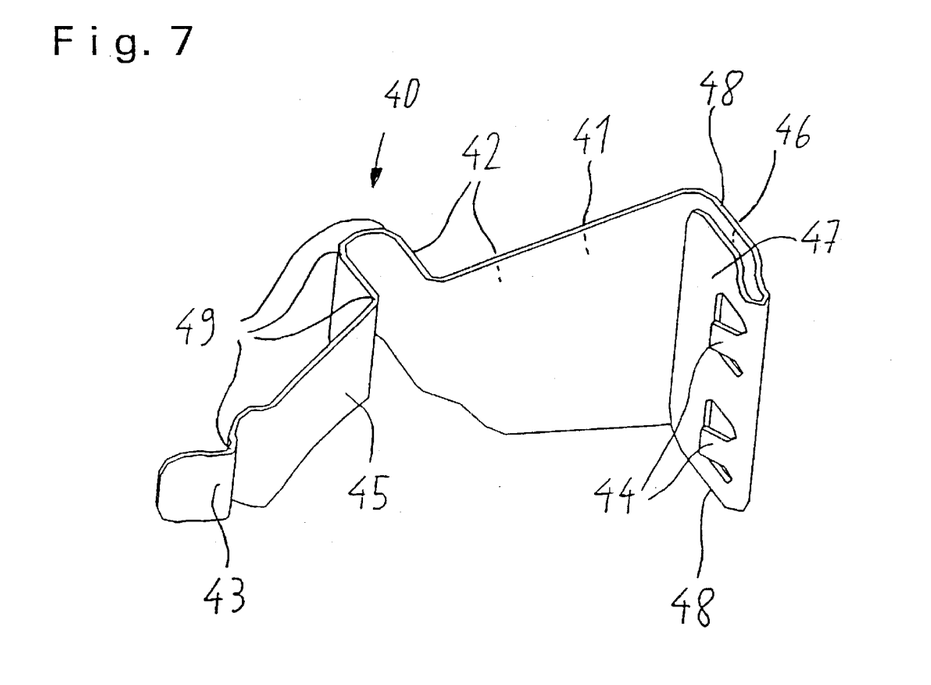
FIG. 7 shows a second embodiment of a securing element which can be used as a removal lock in the locking mechanism according to FIGS. 1 to 5.

FIG. 7 shows a further variation of a removal lock 40 formed by a single securing element 41.

This securing element 41 also has an operating section 42 through which the securing element 41 can interact in the same way with a contact element as the securing element 31 previously described.

Furthermore the securing element 41 has an angled flat surface section 46 with a reinforcement 47 and clip elements 44 which are each defined by an upper and a lower edge 48. The function and construction of this flat surface section correspond to those explained with reference to FIG. 6.

At its front end the securing element 41 is provided with a suspension mounting 43 through which it can be suspended in a suitable opening of a bearing block 3 (see FIGS. 1 to 5). The suspension mounting 43 is adjoined by a bending area 49 in which the securing element 41 is formed so that in the event of load on the operating section 42 by a contact element it executes a swivel movement as already explained with reference to FIGS. 4 and 5.

A part of the section adjoining the suspension mounting 43 thereby acts as a spring element 45 through which the securing element 41 is supported on an outer wall of a bearing block 3 (see FIGS. 1 to 3) so that unlocking of the locking mechanism is not obstructed so long as no contact element is inserted in the contact 21 (see FIGS. 1 to 3).

Figure 8:
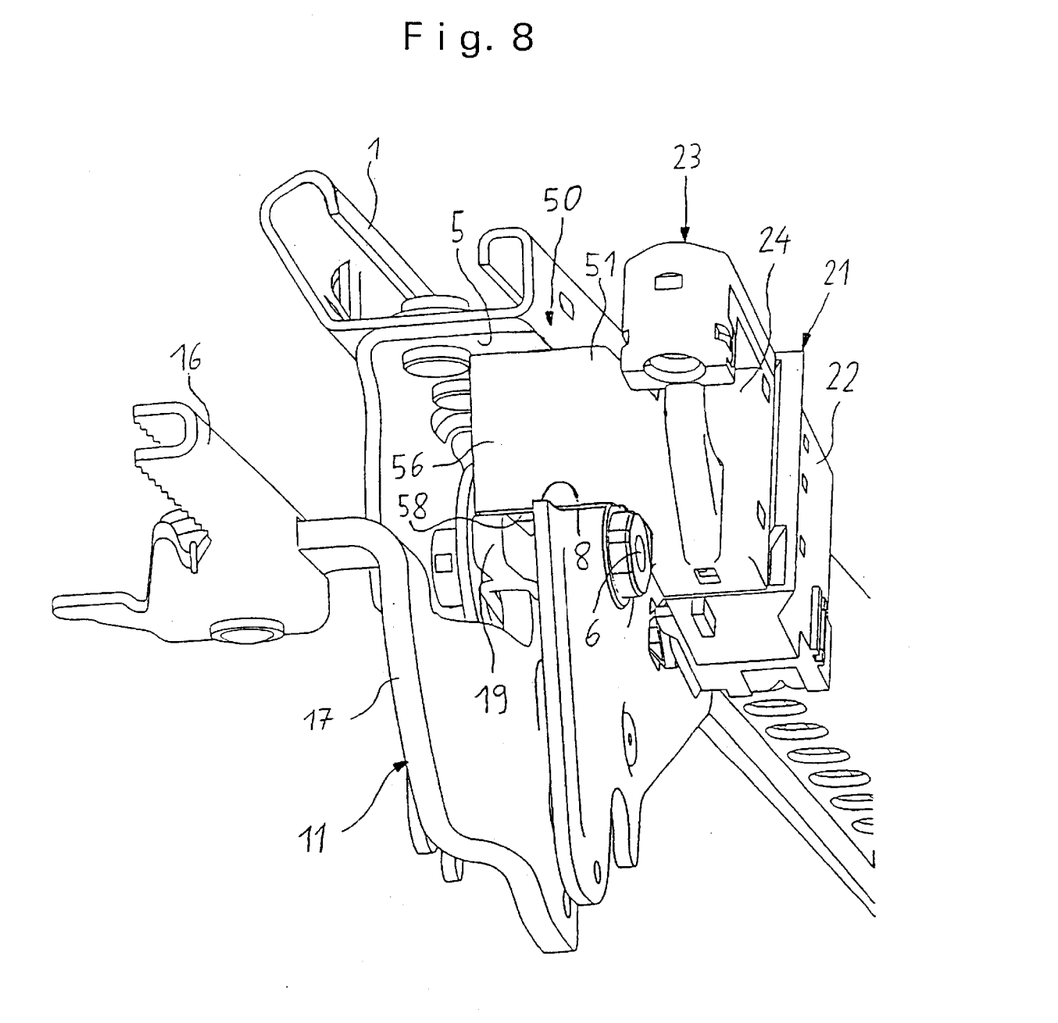
FIG. 8 shows a locking mechanism with a securing element which is integrated in a contact element on the vehicle side.

FIG. 8 shows a further embodiment of a removal lock 30 for a locking mechanism 10 as explained with reference to FIGS. 1 to 5.

This removal locking 30 comprises a single securing element 51 which is formed directly on the housing 24 of a contact 23 on the vehicle side. The housing 24 and the securing element 51 are thereby preferably formed as Outsert parts.

The embodiment shown in FIG. 8 differs from the embodiments of FIGS. 1 to 5 in that the opening 8 in the bearing block 3 here allows the securing element 51 to slide between the locking element 19 and the abutment 5 parallel to the insert direction of the contact 23 into the socket 21.

In the same way as already described with reference to FIGS. 4 and 5 unlocking of the locking mechanism 10 is hereby prevented since the flat surface section 56 of the securing element 51 defined by the edges 58 prevents swivel movement of the locking element 19 and thus also of the lock element 17.

What is claimed is:

1. A seat fastening assembly for a motor vehicle comprising:
    at least one part of a vehicle seat, which has at least one electric contact element which can be coupled to an electric contact element from another portion of the motor vehicle;

a locking mechanism which can be unlocked to remove the at least one part of the vehicle seat from the motor vehicle; and a removal lock which prevents unlocking of the locking mechanism when the two contact elements are in a coupled position, wherein the removal lock includes a securing element which when the contact elements are in the coupled position is mounted between a movable locking element of the locking mechanism and a stop connected to the vehicle seat, and which is forced against the stop by the locking element when an attempt is made at unlocking the seat.

2. Device according to claim 1 wherein the forces exerted by the locking element on the securing element are directed onto the stop so that the securing element transfers essentially only compression forces to the stop.

3. Device according to one of the claims 1 and 2 wherein the securing element is arranged between the locking element and the stop such that the forces exerted by the locking element engage on a side of the securing element which provides the greatest resistance moment to any shear forces.

4. Device according to claim 2 wherein the securing element is designed with a flat surface at least in one section and the forces exerted by the locking element engage on an edge of the flat surface section.

5. Device according to claim 2 wherein the securing element has a reinforcement in the area in which the forces exerted by the locking element engage.

6. Device according to claim 1 wherein the securing element is formed in one piece.

7. Device according to claim 1 wherein the securing element is formed as a sheet metal part.

8. Device according to claim 1 wherein the securing element is formed as an Outsert part in which metal function areas are injection moulded into a plastics cover.

9. Device according to claim 1 wherein the securing element is connected for swivel movement to the at least one part of the vehicle seat.

10. Device according to claim 9 wherein the swivel movement is guaranteed through a bending area integrated into that of the securing element.

11. Device according to claim 10 wherein the securing element is connected to the at least one part of the vehicle seat through a suspension mounting.

12. Device according to one of claims 9 and 10 wherein the securing element is integrated in one piece into a housing of the contact element on the seat side of the at least one part of the vehicle seat.

13. Device according to claim 1 wherein the securing element has an operating section through which the securing element enters into active connection with the contact element on the vehicle side when the contact elements are in the coupled position wherein the securing element is guided between the locking element and the stop.

14. Device according to claim 10 wherein a resilient section is formed in one piece on the securing element through which the securing element is supported on the at least one part of the vehicle seat and which counteracts movement of the securing element between the locking element and the stop.

15. Device according to claim 1 wherein the securing element is connected to the contact element on the vehicle side.

16. Device according to claim 15 wherein the securing element is integrated in one piece in a housing of the contact element on the vehicle side.

17. Device according to claim 1 wherein the locking mechanism is connected to a lower rail of a longitudinal seat adjustment device through at least one bearing block.

18. Device according to claim 17 wherein the stop is formed on the bearing block.

19. Device according to one of claims 17 and 18 wherein a passage opening for the securing element is provided in the bearing block.

20. Device according to claim 17 wherein the locking element is able to swivel together with a lock element of the locking mechanism.

21. Device according to claim 20 wherein the locking element is mounted on the same axis as a lock element of the locking mechanism.

22. Device according to claim 1 wherein the contact elements are formed as plug elements.

23. A seat fastening for a motor vehicle, comprising:
   at least one part of a vehicle seat to be releasably fastened to the motor vehicle, the at least one part having at least one electric contact element to be coupled to an electric contact element from another portion of the motor vehicle and a stop;
   a locking mechanism movable between a locked position to secure the at least one part of the vehicle seat to the motor vehicle and an unlocked position to permit removal of the at least one part of the vehicle seat from the motor vehicle; and
   a removal lock movable between a first position which permits the locking mechanism to move from the locked position to the unlocked position and a second position that prevents movement of the locking mechanism from the locked position to the unlocked position;
   wherein the first position of the removal lock blocks access for electrical connection to the at least one electric contact element and the second position of the removal lock permits access for the electrical connection to the at least one electric contact element.

24. The seat fastening assembly of claim 23, wherein the removal lock includes a securing element that can be forced against the stop by a locking element of the locking mechanism during an attempt to move the locking mechanism from the locked position to the unlocked position.

* * * * *